United States Patent
Zhu

(10) Patent No.: US 11,665,719 B2
(45) Date of Patent: May 30, 2023

(54) METHOD AND APPARATUS FOR TRANSMITTING DATA

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 32 days.

(21) Appl. No.: 17/014,375

(22) Filed: Sep. 8, 2020

(65) Prior Publication Data

US 2020/0404673 A1 Dec. 24, 2020

Related U.S. Application Data

(63) Continuation of application No. PCT/CN2018/081397, filed on Mar. 30, 2018.

(51) Int. Cl.
*H04W 72/04* (2009.01)
*H04L 5/00* (2006.01)
*H04W 16/14* (2009.01)

(52) U.S. Cl.
CPC ....... *H04W 72/0493* (2013.01); *H04L 5/0092* (2013.01); *H04W 16/14* (2013.01); *H04W 72/0453* (2013.01)

(58) Field of Classification Search
CPC ................................................. H04W 72/0493
See application file for complete search history.

(56) References Cited

U.S. PATENT DOCUMENTS

| | | | |
|---|---|---|---|
| 11,178,287 B1 * | 11/2021 | Zappaterra | H04L 45/00 |
| 2015/0163680 A1 | 6/2015 | Valliappan et al. | |
| 2016/0001461 A1 | 1/2016 | Wong et al. | |
| 2016/0014610 A1 * | 1/2016 | Wong | H04W 16/14 |
| | | | 455/454 |
| 2018/0279386 A1 * | 9/2018 | Liu | H04W 74/0875 |
| 2018/0376494 A1 * | 12/2018 | Hu | H04W 74/0808 |
| 2020/0404699 A1 * | 12/2020 | Zheng | H04L 5/001 |

FOREIGN PATENT DOCUMENTS

| | | |
|---|---|---|
| CN | 105072690 A | 11/2015 |
| CN | 105592478 A | 5/2016 |
| CN | 105814929 A | 7/2016 |
| CN | 106664160 A | 5/2017 |
| CN | 107306454 A | 10/2017 |
| WO | WO 2016/125023 A1 | 8/2016 |
| WO | WO 2017/148205 A1 | 9/2017 |

OTHER PUBLICATIONS

ISA State Intellectual Property Office of the People's Republic of China, International Search Report Issued in Application No. PCT/CN2018/081397, dated Jan. 3, 2019, WIPO, 4 pages.
State Intellectual Property Office of the People's Republic of China, Office Action and Search Report Issued in Application No. 2018800003754, dated Sep. 5, 2022, 24 pages.

* cited by examiner

*Primary Examiner* — Abdeltif Ajid
(74) *Attorney, Agent, or Firm* — Finnegan, Henderson, Farabow, Garrett & Dunner, L.L.P.

(57) ABSTRACT

A method for transmitting data, applicable to a data transmitting end with a plurality of unlicensed channel resources, includes: determining a first unlicensed channel resource which is idle from the plurality of unlicensed channel resources; setting the first unlicensed channel resource as a first working channel resource for data transmission; and transmitting data over the first working channel resource.

16 Claims, 15 Drawing Sheets

METHOD AND APPARATUS FOR TRANSMITTING DATA

CROSS-REFERENCE TO RELATED APPLICATION

This application is a continuation of International Application No. PCT/CN2018/081397, filed on Mar. 30, 2018, the disclosure of which is hereby incorporated by reference in its entirety for all purposes.

TECHNICAL FIELD

The present disclosure relates to the field of communication technology, and in particular, relates to a method and an apparatus for transmitting data.

BACKGROUND

A new generation communication system is expected to support a flexible configuration of multiple types of services corresponding to different service requirements. For example, enhanced Mobile Broad Band (eMBB), as a type of service, mainly focuses on the requirements of wide bandwidth, high-speed rate, etc.; Ultra Reliable Low Latency Communication (URLLC), as another type of service, mainly focuses on the requirements of high reliability and low latency; and massive Machine Type Communication (mMTC), as another type of service, mainly focuses on the requirements of a large number of connections. However, with the service requirements developing, just utilizing licensed spectrum may not be enough to satisfy the increasing service requirements in the new generation communication system.

SUMMARY

According to a first aspect of the present disclosure, there is provided a method of transmitting data, applicable to a data transmitting end with a plurality of unlicensed channel resources. The method includes: determining a first unlicensed channel resource which is idle from the plurality of unlicensed channel resources; setting the first unlicensed channel resource as a first working channel resource for data transmission; and transmitting data over the first working channel resource.

According to a second aspect of the present disclosure, there is provided an apparatus for transmitting data, applicable to a data transmitting end having a plurality of unlicensed channel resources. The apparatus includes: a processor; and a memory for storing instructions executable by the processor. The processor is configured to: determine a first unlicensed channel resource which is idle from the plurality of unlicensed channel resources; set the first unlicensed channel resource as a first working channel resource for data transmission; and transmit data over the first working channel resource.

It is to be understood that the above general description and the below detailed description are merely exemplary and explanatory, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

DETAILED DESCRIPTION OF THE EMBODIMENTS

Reference will now be made in detail to exemplary embodiments, examples of which are illustrated in the accompanying drawings. When the following description refers to the drawings, like numerals in different drawings represent like or similar elements unless otherwise indicated. The implementations described in the following exemplary embodiments do not represent all implementations consistent with the present disclosure. Rather, they are merely examples of apparatuses and methods consistent with some aspects of the present disclosure as recited in the appended claims.

Terms used in the present disclosure are for the purpose of describing exemplary embodiments only, and are not intended to limit the present disclosure. For example, although terms "first," "second," "third," and the like may be used in the present disclosure to describe various information, such information should not be limited to these terms. For example, without departing from the scope of the present disclosure, first information may be referred as second information; and similarly, second information may also be referred as first information. Depending on the context, the word "if" as used herein may be interpreted as "when", "upon", or "in response to determining".

Figure 1:
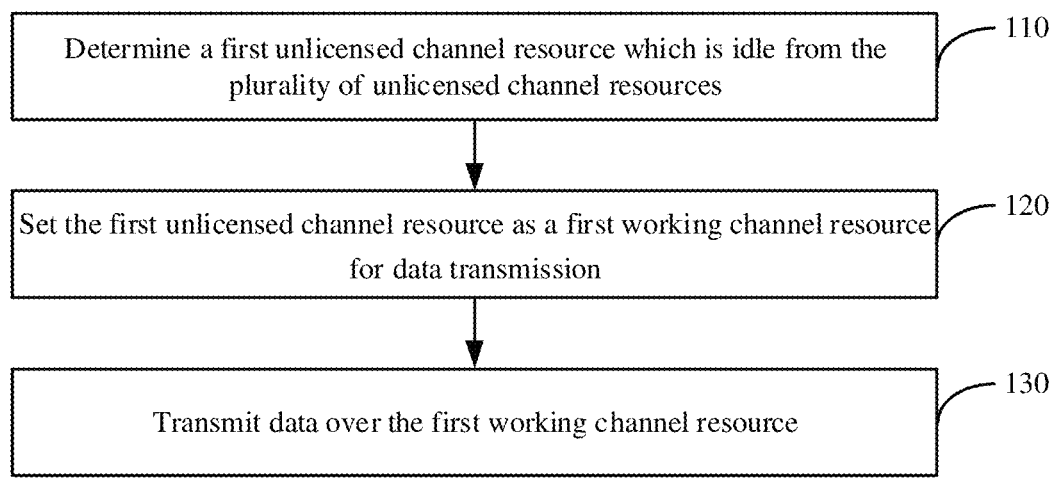
FIG. 1 is a flowchart illustrating a method of transmitting data according to an exemplary embodiment.

FIG. 1 is a flowchart illustrating a method of transmitting data according to an exemplary embodiment. The method of transmitting data may be applicable to a data transmitting end. The data transmitting end may have a plurality of unlicensed channel resources, and may be a base station, a terminal, or another device that transmits data. As shown in FIG. 1, the method of transmitting data includes the following steps.

At step 110, a first unlicensed channel resource which is idle is determined from the plurality of unlicensed channel resources.

In some embodiments of the present disclosure, the plurality of unlicensed channel resources may be configured by a base station for a terminal. If the data transmitting end is the base station, the base station is to determine a first unlicensed channel resource which is idle from the plurality of unlicensed channel resources. If the data transmitting end is the terminal, the terminal is also to determine a first unlicensed channel resource which is idle from the plurality of unlicensed channel resources.

In an embodiment, the plurality of unlicensed channel resources at step 110 may be implemented in, but not limited to, the following schemes.

In a first scheme, the plurality of unlicensed channel resources configured by the base station for the terminal may be a plurality of bandwidth parts on an unlicensed carrier, where a bandwidth part may be continuous resources on a frequency range within a carrier.

In a second scheme, the plurality of unlicensed channel resources configured by the base station for the terminal may be a plurality of unlicensed carriers.

In a third scheme, the plurality of unlicensed channel resources configured by the base station for the terminal may be a plurality of bandwidth parts on a plurality of unlicensed carriers, where a bandwidth part may be continuous resources on a frequency range within a carrier.

At step 120, the first unlicensed channel resource is set as a first working channel resource for data transmission.

At step 130, data is transmitted over the first working channel resource.

Figure 2:
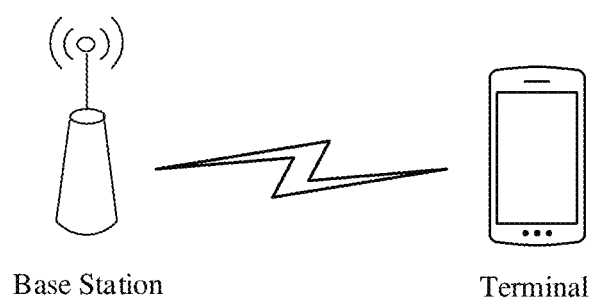
FIG. 2 is a schematic diagram of an application scenario for a method of transmitting data according to an exemplary embodiment.

FIG. 2 is a schematic diagram of an application scenario for the method of transmitting data according to an exemplary embodiment. As shown in FIG. 2, the scenario includes a base station and a terminal.

Figure 3:
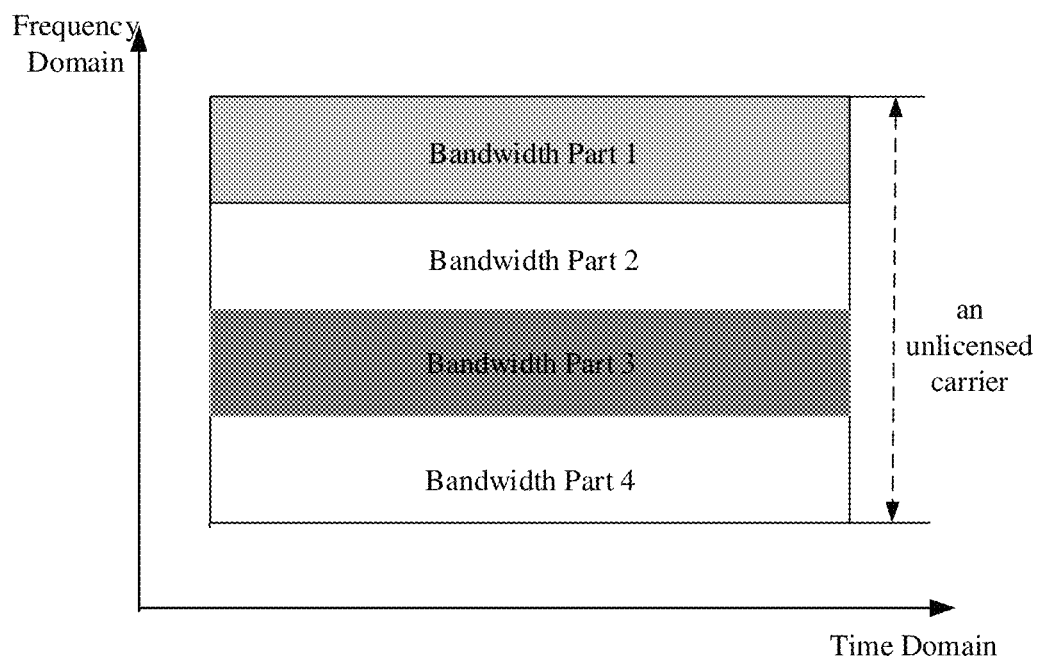
FIG. 3 is a schematic diagram illustrating bandwidth parts according to an exemplary embodiment.

FIG. 3 is a schematic diagram illustrating bandwidth parts according to an exemplary embodiment. As shown in FIG. 3, four bandwidth parts are configured on an unlicensed carrier by the base station for the terminal: Bandwidth Part 1, Bandwidth Part 2, Bandwidth Part 3, and Bandwidth Part 4, respectively. When ready to transmit data, the base station determines a bandwidth part which is idle from the four bandwidth parts, sets the bandwidth part which is idle as the first working channel resource for data transmission, and transmits data over the first working channel resource.

In the above embodiment that, by determining a first unlicensed channel resource which is idle from a plurality of unlicensed channel resources, setting the first unlicensed channel resource as a first working channel resource for data transmission, and transmitting data over the first working channel resource, the data transmitting end can quickly select an unlicensed channel resource from the plurality of unlicensed channel resources to use, thereby reducing the time delay in data transmission and improving the efficiency of data transmission.

Figure 4:
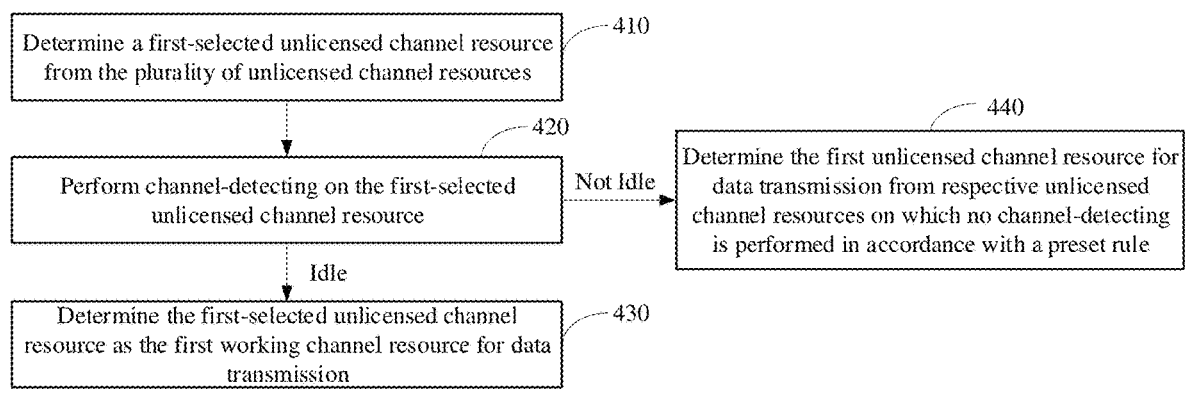
FIG. 4 is a flowchart illustrating another method of transmitting data according to an exemplary embodiment.

FIG. 4 is a flowchart illustrating another method of transmitting data according to an exemplary embodiment. The method of transmitting data may be applicable to a data transmitting end. The data transmitting end may have a plurality of unlicensed channel resources, and may be a base station, a terminal, or another device that transmits data. This method is based on the method shown in FIG. 1, and may include the following steps to perform step 110 in FIG. 1.

At step 410, a first-selected unlicensed channel resource is determined from the plurality of unlicensed channel resources.

In some embodiments of the present disclosure, if the data transmitting end is a base station and the plurality of unlicensed channel resources are configured by the base station for a terminal, the first-selected unlicensed channel resource may be determined from the plurality of unlicensed channel resources by the base station. If the data transmitting end is a terminal and the plurality of unlicensed channel resources are configured by a base station for the terminal, the first-selected unlicensed channel resource may be determined from the plurality of unlicensed channel resources by the terminal. For the base station and the terminal, however, respective implementations of determining the first-selected unlicensed channel resource may be different, as follows.

In an embodiment, the data transmitting end is the base station and the plurality of unlicensed channel resources are configured by the base station for the terminal. When step 410 is performed, the first-selected unlicensed channel resource may be determined by the base station, based on historical state information corresponding to the plurality of unlicensed channel resources stored by the base station, or channel state information corresponding to the plurality of unlicensed channel resources reported by the terminal.

In an embodiment, the data transmitting end is the terminal, the plurality of unlicensed channel resources are configured by the base station for the terminal, and the terminal has set one or more of the plurality of unlicensed channel resources as a current working channel resource for data interaction, also referred to as data exchange. When step 410 is performed, the first-selected unlicensed channel resource may be determined by the terminal from the plurality of unlicensed channel resources in accordance with a predefined rule, in which the first-selected unlicensed channel resource may be pre-configured, or may be the current working channel resource. In an embodiment, the current working channel resource may be determined by the terminal as the first-selected unlicensed channel resource.

In addition, in an embodiment, after the terminal determines the first-selected unlicensed channel resource, the terminal may proceed to inform the base station of the first-selected unlicensed channel resource.

For example, first information is generated. The first information indicates the first-selected unlicensed channel resource determined by the terminal.

The first information is transmitted to the base station through a first designated signaling, to inform the base station of the first-selected unlicensed channel resource determined by the terminal.

The first designated signaling may be a defined uplink signaling, such as a Physical Uplink Control Channel (PUCCH) signaling, a Physical Uplink Shared Channel (PUSCH) signaling, or the like. It may also be a newly defined signaling.

At step 420, channel-detecting is performed on the first-selected unlicensed channel resource. If it is detected that the first-selected unlicensed channel resource is idle, step 430 is performed; if it is detected that the first-selected unlicensed channel resource is not idle, step 440 is performed. When the first-selected unlicensed channel resource is not idle, it may be in busy state, in occupied state, in operation state, or the like.

In some embodiments of the present disclosure, when the data transmitting end is the base station, the base station may perform step 430 or step 440 based on an detection result in response to performing channel-detecting on the first-selected unlicensed channel resource; when the data transmitting end is the terminal, in response to performing channel-detecting on the first-selected unlicensed channel resource, the terminal is to inform the base station of the detection result besides performing step 430 or step 440, e.g., when the current working channel resource is determined by the terminal as the first-selected unlicensed channel resource.

In an embodiment, the data transmitting end is the terminal, the plurality of unlicensed channel resources are configured by the base station for the terminal, and the terminal has set one or more of the plurality of unlicensed channel resources as a current working channel resource for data interaction.

In an embodiment, after step 420, second information is generated when it is detected that the first-selected unlicensed channel resource is idle. The second information indicates that the first-selected unlicensed channel resource is taken as the first working channel resource by the terminal.

The second information is transmitted to the base station through a second designated signaling, to inform the base station of the first-selected unlicensed channel resource being taken as the first working channel resource by the terminal.

In this way, if the first-selected unlicensed channel resource is the current working channel resource, the base station learns that the terminal is to transmit data over the current working channel resource when receiving the second information.

In an embodiment, the data transmitting end is the terminal, the plurality of unlicensed channel resources are configured by the base station for the terminal, and the terminal has set one or more of the plurality of unlicensed channel resources as a current working channel resource for data interaction.

In an embodiment, after step 420, third information is generated when it is detected that the current working channel resource is not idle. The third information indicates that the current working channel resource is not taken as the first working channel resource by the terminal.

The third information is transmitted to the base station through a third designated signaling, so that the base station learns from the third information that the current working channel resource is not taken as the first working channel resource by the terminal, and is triggered to switch the working channel resource.

In this way, the base station learns that the terminal is not to transmit data over the current working channel resource when receiving the third information, and thus may trigger itself to switch working channel resource in time.

In an embodiment, the third designated signaling may be transmitted over a designated licensed channel resource.

At step 430, the first-selected unlicensed channel resource is determined as the first working channel resource for data transmission.

At step 440, the first unlicensed channel resource for data transmission is determined from respective unlicensed channel resources on which no channel-detecting is performed in accordance with a preset rule.

In some embodiments of the present disclosure, the preset rule may be set by the data transmitting end, or may be obtained in other manners.

In an embodiment, when the data transmitting end is the base station, the preset rule is set by the base station.

When the data transmitting end is the terminal, the preset rule is set by the terminal, or is set by the base station for the terminal and is transmitted to the terminal through a fourth designated signaling.

The fourth designated signaling may be a Radio Resource Control (RRC) signaling, or a Media Access Control-Control Element (MAC-CE) signaling; or may be a physical layer signaling.

In some embodiments, step 440 may be implemented in, but not limited to, the following manners.

In a first manner, the respective unlicensed channel resources on which no channel-detecting is performed may be sorted in accordance with a preset priority rule. Then, channel-detecting is performed in a descending order of priority on the respective unlicensed channel resources on which no channel-detecting is performed until one idle unlicensed channel resource is detected, and the idle unlicensed channel resource is taken as the first unlicensed channel resource.

In a second manner, channel-detecting is performed in a random order on the respective unlicensed channel resources on which no channel-detecting is performed until one idle unlicensed channel resource is detected, and the idle unlicensed channel resource is taken as the first unlicensed channel resource.

In a third manner, the respective unlicensed channel resources on which no channel-detecting is performed may be sorted in accordance with a preset channel utilization rate criterion. Then, channel-detecting is performed in an ascending order of channel utilization rate on the respective unlicensed channel resources on which no channel-detecting is performed until one idle unlicensed channel resource is detected, and the idle unlicensed channel resource is determined as the first unlicensed channel resource.

The channel utilization rate may correspond to a number of resident users on each channel. The larger the number of resident users is, the higher the channel utilization rate is; and the smaller the number of resident users is, the lower the channel utilization rate is. During determining the first unlicensed channel resource for data transmission, the channel with the least number of resident users is preferentially selected.

In the above embodiments, by determining a first-selected unlicensed channel resource from a plurality of unlicensed channel resources, performing channel-detecting on the first-selected unlicensed channel resource, determining the first-selected unlicensed channel resource as a first working channel resource for data transmission if it is detected that the first-selected unlicensed channel resource is idle, and determining a first unlicensed channel resource for data transmission from the respective unlicensed channel resources on which no channel-detecting is performed in accordance with a preset rule if it is detected that the first-selected unlicensed channel resource is not idle, it can be implemented that the first-selected unlicensed channel resource is preferentially taken as the first unlicensed channel resource for data transmission, thereby improving the reliability of data transmission.

Figure 5:
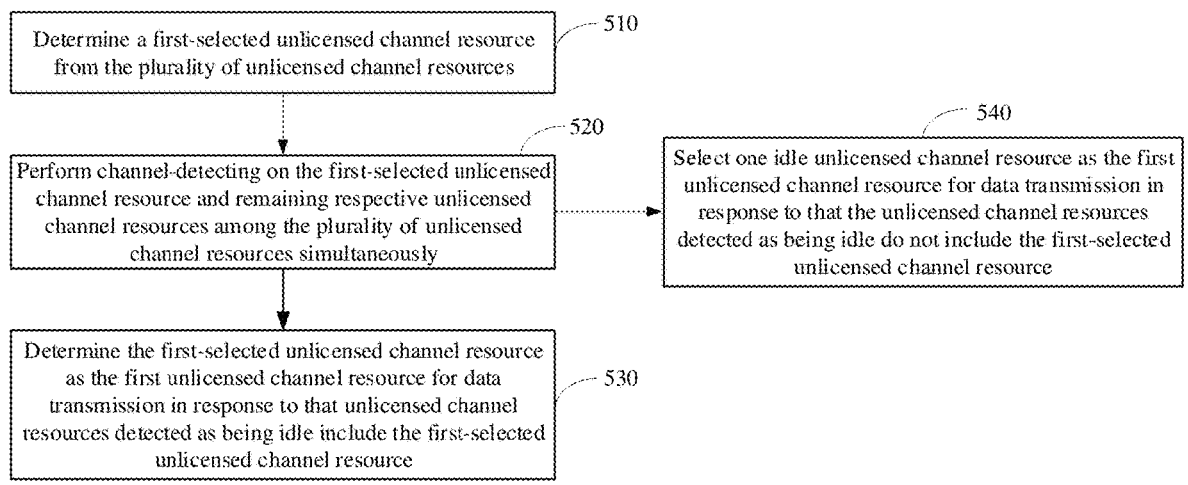
FIG. 5 is a flowchart illustrating another method of transmitting data according to an exemplary embodiment.

FIG. 5 is a flowchart illustrating another method of transmitting data according to an exemplary embodiment. The method of transmitting data may be applicable to a data transmitting end. The data transmitting end may have a plurality of unlicensed channel resources, and may be a base station, a terminal, or another device that transmits data. This method is based on the method shown in FIG. 1, and may include the following steps to perform step 110 in FIG. 1.

At step 510, a first-selected unlicensed channel resource is determined from the plurality of unlicensed channel resources, similar to step 410 (FIG. 4).

At step 520, channel-detecting is performed on the first-selected unlicensed channel resource and remaining respective unlicensed channel resources among the plurality of unlicensed channel resources simultaneously.

At step 530, the first-selected unlicensed channel resource is determined as the first unlicensed channel resource for data transmission in response to that unlicensed channel resources detected as being idle include the first-selected unlicensed channel resource.

At step 540, one idle unlicensed channel resource is selected as the first unlicensed channel resource for data transmission in response to that the unlicensed channel resources detected as being idle do not include the first-selected unlicensed channel resource.

In the above embodiment, by determining a first-selected unlicensed channel resource from a plurality of unlicensed channel resources, performing channel-detecting on the first-selected unlicensed channel resource and the remaining respective unlicensed channel resources among the plurality of unlicensed channel resources simultaneously, determining the first-selected unlicensed channel resource as a first unlicensed channel resource for data transmission in response to that the unlicensed channel resources detected as being idle include the first-selected unlicensed channel resource, and selecting one idle unlicensed channel resource as the first unlicensed channel resource for data transmission in response to that the unlicensed channel resources detected as being idle do not include the first-selected unlicensed channel resource, it can shorten the time for channel-detecting on the basis of ensuring that the first-selected unlicensed channel resource is preferentially taken as the first unlicensed channel resource for data transmission, thereby further reducing the time delay in data transmission.

Figure 6:
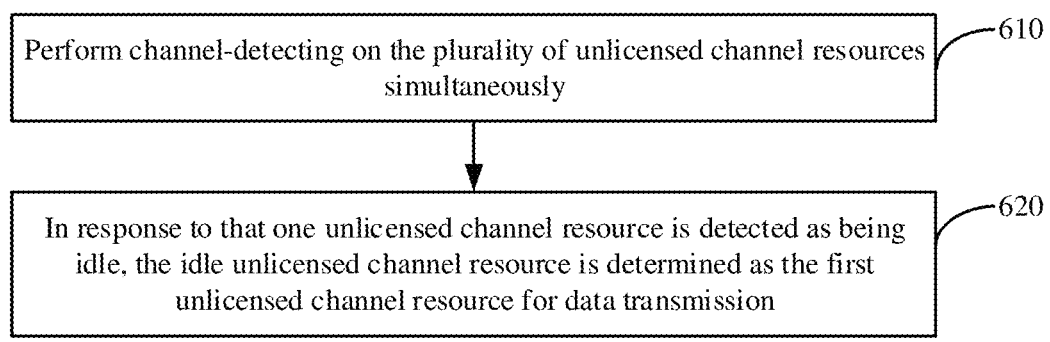
FIG. 6 is a flowchart illustrating another method of transmitting data according to an exemplary embodiment.

FIG. 6 is a flowchart illustrating another method of transmitting data according to an exemplary embodiment. The method of transmitting data may be applicable to a data transmitting end. The data transmitting end may have a plurality of unlicensed channel resources, and may be a base station, a terminal, or another device that transmits data. This method is based on the method shown in FIG. 1, and may include the following steps to perform step 110 in FIG. 1.

At step 610, channel-detecting is performed on the plurality of unlicensed channel resources simultaneously.

At step 620, in response to that one unlicensed channel resource is detected as being idle, the idle unlicensed channel resource is determined as the first unlicensed channel resource for data transmission.

In the above embodiment, by performing channel-detecting on a plurality of unlicensed channel resources simultaneously and, in response to that one unlicensed channel resource is detected as being idle, determining the idle unlicensed channel resource as a first unlicensed channel resource for data transmission, it can shorten the time for channel-detecting and can also improve the efficiency of data transmission.

In addition, during performing step 110, it is not necessary to determine the first-selected unlicensed channel resource, as shown in FIG. 6. The data transmitting end may determine the first unlicensed channel resource which is idle from the plurality of unlicensed channel resources in accordance with a designated rule. For the designated rule, it is not necessary to determine the first-selected unlicensed channel resource too. When the data transmitting end is a base station, the designated rule may be set by the base station; and when the data transmitting end is a terminal, the designated rule may be set by the terminal, or may be set by the base station for the terminal and transmitted to the terminal through a fifth designated signaling.

The determination of the first unlicensed channel resource which is idle from the plurality of unlicensed channel resources in accordance with the designated rule, may be implemented in, but not limited to, the following manners.

In a first manner, the plurality of unlicensed channel resources may be sorted in accordance with a preset priority rule, and then channel-detecting is performed on the plurality of unlicensed channel resources in a descending order of priority until one idle unlicensed channel resource is detected, and thus taking the idle unlicensed channel resource as the first unlicensed channel resource.

In a second manner, channel-detecting is performed on the plurality of unlicensed channel resources in a random order until one idle unlicensed channel resource is detected, and thus taking the idle unlicensed channel resource as the first unlicensed channel resource.

In a third manner, the plurality of unlicensed channel resources may be sorted in accordance with a preset channel utilization rate criterion. Then, channel-detecting is performed on the plurality of unlicensed channel resources in an ascending order of channel utilization rate until one idle unlicensed channel resource is detected, and the idle unlicensed channel resource is determined as the first unlicensed channel resource.

The channel utilization rate may correspond to a number of resident users on each channel. The larger the number of resident users is, the higher the channel utilization rate is; and the smaller the number of resident users is, the lower the channel utilization rate is. During determining the first unlicensed channel resource for data transmission, the channel with the least number of resident users is preferentially selected.

In the above embodiments, by determining a first unlicensed channel resource which is idle from a plurality of unlicensed channel resources in accordance with a designated rule, such as priority, random order, or channel utilization rate, the first unlicensed channel resource may be determined with enhanced reliability, and thereby improving the efficiency of data transmission.

In addition, in the above embodiments, if the data transmitting end is the terminal, in response to determining the first unlicensed channel resource for data transmission, the terminal is further to notify the base station that data may be transmitted over the first unlicensed channel resource, as follows.

For example, fourth information may be generated. The fourth information indicates the first unlicensed channel resource determined by the terminal.

The fourth information is transmitted to the base station through a sixth designated signaling, to inform the base station of the first unlicensed channel resource determined by the terminal.

In this way, in response to receiving the fourth information, the base station learns on which unlicensed channel resource the terminal is to transmit data, thereby improving the reliability of data transmission.

The method of transmitting data provided by the present disclosure will be described in different scenarios below by taking an example in which a plurality of bandwidth parts are configured on a carrier by a data transmitting end. The method of transmitting data may also be applicable to another example in which a plurality of carriers are configured by the data transmitting end, or applicable to another example in which a plurality of bandwidth parts are configured on a plurality of carriers by the data transmitting end.

In a first scenario, the data transmitting end is a base station, the plurality of bandwidth parts are configured by the base station on a carrier for a terminal, and the terminal has set one or more of these bandwidth parts as a current working channel resource for data interaction.

1) Determine a First-Selected Bandwidth Part.

For the terminal, one of the bandwidth parts which have been configured for the terminal is selected by the base station as the first-selected bandwidth part (e.g., Bandwidth Part 1 in FIG. 3). When being to transmit data for the terminal, the base station may preferentially take this bandwidth part for data transmission. The selection of the first-selected bandwidth part may be determined based on historical information of the base station or the reported information of the terminal. It should be noted that the step of selecting the first-selected bandwidth part is optional, that is, the process of selecting a bandwidth part subsequently described may be directly performed without determining the first-selected bandwidth part.

2) Determine a Working Bandwidth Part for Data Transmission.

The base station performs channel-detecting on Bandwidth Part 1. In response to finding that Bandwidth Part 1 is idle, the base station may transmit the data to the terminal over Bandwidth Part 1. In response to finding that the channel state of Bandwidth Part 1 is busy (i.e., not idle), the base station is to select another bandwidth part for channel-detecting and data transmission based on a preset rule. In an implementation, the preset rule is a preset priority rule, and the base station may sort the other bandwidth parts based on the preset priority rule, perform channel-detecting on the other bandwidth parts in a descending order of priority until certain one idle bandwidth part is detected, and then transmit the data over this bandwidth part for the terminal. In another implementation, the base station may perform channel-detecting on the other bandwidth parts in a random order until certain one idle bandwidth part is detected, and then transmit the data over this bandwidth part for the terminal. In another implementation, the base station may select the bandwidth part in accordance with a certain criterion, for example, in accordance with a number of resident users on each channel. The larger the number of resident users is, the higher the channel utilization rate is; the smaller the number of resident users is, the lower the channel utilization rate is. During determining the working bandwidth part for data transmission, the channel with the smallest number of resident users may be preferentially selected.

In addition, when there exists the first-selected bandwidth part, the base station may also perform channel-detecting on the first-selected bandwidth part and the other bandwidth parts simultaneously.

In a second scenario 2, the data transmitting end is a terminal, and a base station has configured a plurality of bandwidth parts on one carrier for the terminal, and the terminal has set one or more of these bandwidth parts as a current working channel resource for data interaction.

1) Determine a First-Selected Bandwidth Part

The first-selected bandwidth part (e.g., Bandwidth Part 1 as shown in FIG. 3) may be determined by the terminal based on a predefined rule. For example, the first-selected bandwidth part is a current working bandwidth part. The terminal reports the selection of the first-selected bandwidth part to the base station, or, the base station may implicitly learn that the first-selected bandwidth part determined by the terminal is the current working bandwidth part.

2) Determine the Working Bandwidth Part for Data Transmission

The terminal performs channel-detecting on Bandwidth Part 1. In response to finding that Bandwidth Part 1 is idle, the terminal notifies the base station that data may be transmitted over Bandwidth Part 1. In response to finding that the channel state of Bandwidth Part 1 is busy (i.e., not idle), the terminal may select another bandwidth part for channel-detecting and data transmission based on a preset rule. The preset rule may be determined by the terminal, or may be determined by the base station. In particular, when the preset rule is determined by the base station, the base station may notify the terminal of the predefined preset rule through an RRC signaling, a MAC CE signaling, or a physical layer signaling. In an implementation, the preset rule is a preset priority rule, and the terminal may sort the other bandwidth parts based on the preset priority rule, perform channel-detecting on the other bandwidth parts in a descending order of priority until certain one idle bandwidth part is detected, and then notify the base station that the data may be transmitted over this bandwidth part. In another implementation, the terminal may perform channel-detecting on the other bandwidth parts in a random order until certain one idle bandwidth part is detected, and then notify the base station that the data may be transmitted over this bandwidth part. In another implementation, the terminal may select the bandwidth part based on a certain criterion, for example, in accordance with a number of resident users on each channel. The larger the number of resident users is, the higher the channel utilization rate is; the smaller the number of resident users is, the lower the channel utilization rate is. During determining the working bandwidth part for data transmission, the channel with the smallest number of resident users may be preferentially selected.

In addition, the terminal may preferentially perform channel-detecting on the first-selected bandwidth part, and if its channel is busy, perform channel-detecting on the other bandwidth parts sequentially or simultaneously. The terminal may also perform channel-detecting simultaneously on all the bandwidth parts which have been configured.

Furthermore, if the bandwidth part determined by the terminal for data transmission is not the current working bandwidth part, the terminal is to transmit a signaling to trigger the base station to switch the working bandwidth part. The transmitted signaling may also be transmitted over a licensed carrier.

Corresponding to the above embodiments of the method of transmitting data, the present disclosure also provides embodiments of an apparatus for transmitting data.

Figure 7:
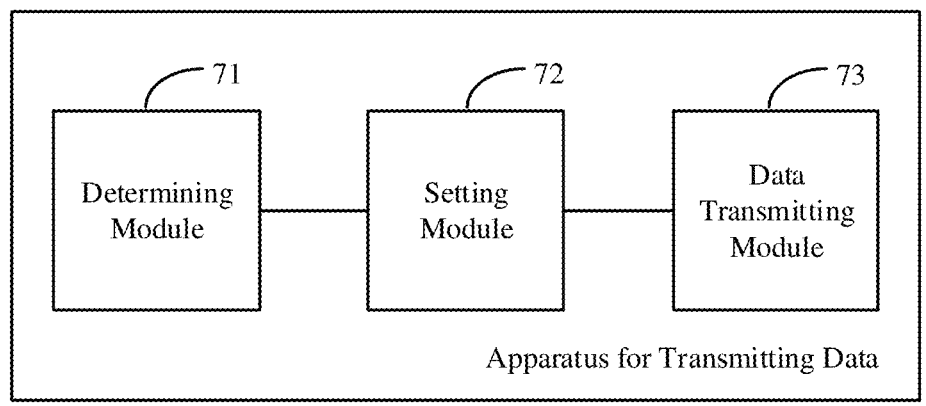
FIG. 7 is a block diagram illustrating an apparatus for transmitting data according to an exemplary embodiment.

FIG. 7 is a block diagram illustrating an apparatus for transmitting data according to an exemplary embodiment. The apparatus for transmitting data may be applicable to a data transmitting end. The data transmitting end may have a plurality of unlicensed channel resources, and may be a base station, a terminal, or another device that transmits data. As shown in FIG. 7, the apparatus for transmitting data may include: a determining module 71 configured to determine a first unlicensed channel resource which is idle from the plurality of unlicensed channel resources; a setting module 72 configured to set the first unlicensed channel resource as a first working channel resource for data transmission; and a data transmitting module 73 configured to transmit data over the first working channel resource.

In the above embodiment, by determining a first unlicensed channel resource which is idle from a plurality of unlicensed channel resources, setting the first unlicensed channel resource as the first working channel resource for data transmission, and transmitting data over the first working channel resource, the data transmitting end can quickly select an unlicensed channel resource from the plurality of unlicensed channel resources to use, thereby reducing the time delay in data transmission, and improving the efficiency of data transmission.

In an embodiment, the plurality of unlicensed channel resources include: a plurality of bandwidth parts configured on an unlicensed carrier, a plurality of unlicensed carriers, or a plurality of bandwidth parts configured on a plurality of unlicensed carriers.

Figure 8:
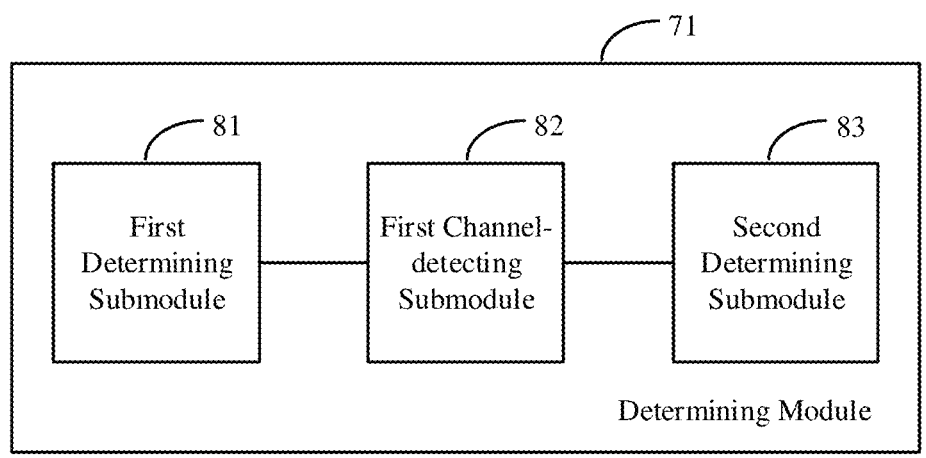
FIG. 8 is a block diagram illustrating another apparatus for transmitting data according to an exemplary embodiment.

In an embodiment, on the basis of the apparatus shown in FIG. 7, as shown in FIG. 8, the determining module 71 may include: a first determining submodule 81 configured to determine a first-selected unlicensed channel resource from the plurality of unlicensed channel resources; a first channel-detecting submodule 82 configured to perform channel-detecting on the first-selected unlicensed channel resource; and a second determining submodule 83 configured to determine the first-selected unlicensed channel resource as the first unlicensed channel resource in response to that it is detected that the first-selected unlicensed channel resource is idle.

Figure 9:
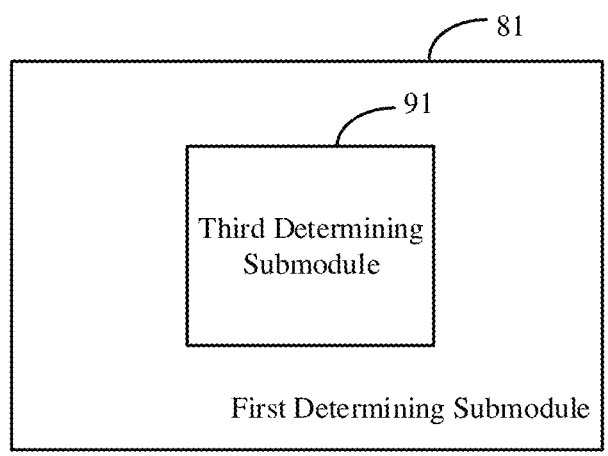
FIG. 9 is a block diagram illustrating another apparatus for transmitting data according to an exemplary embodiment.

In an embodiment, on the basis of the apparatus shown in FIG. 8, the data transmitting end is a base station, and the plurality of unlicensed channel resources are configured by the base station for a terminal. As shown in FIG. 9, the first determining submodule 81 may include: a third determining submodule 91 configured to determine the first-selected unlicensed channel resource based on historical state information corresponding to the plurality of unlicensed channel resources stored by the base station, or channel state information corresponding to the plurality of unlicensed channel resources reported by the terminal.

Figure 10:
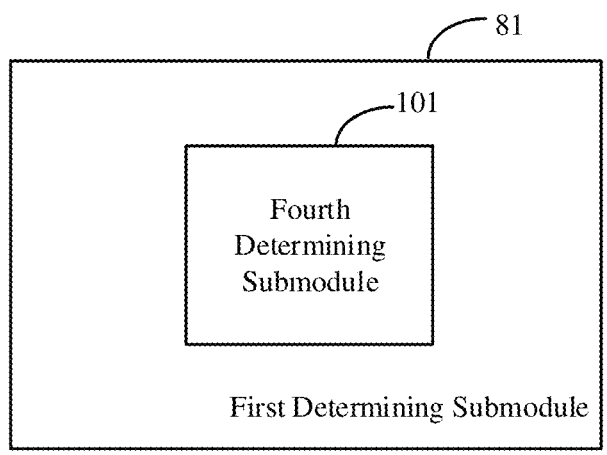
FIG. 10 is a block diagram illustrating another apparatus for transmitting data according to an exemplary embodiment.

In an embodiment, on the basis of the apparatus shown in FIG. 8, the data transmitting end is a terminal, the plurality of unlicensed channel resources are configured by a base station for the terminal, and the terminal has set one or more of the unlicensed channel resources as a current working channel resource for data interaction. As shown in FIG. 10, the first determining submodule 81 may include: a fourth determining submodule 101 configured to determine the first-selected unlicensed channel resource from the plurality of unlicensed channel resources in accordance with a predefined rule. The fourth determining submodule 101 may include a first-selection determining submodule configured to determine the current working channel resource as the first-selected unlicensed channel resource.

Figure 11:
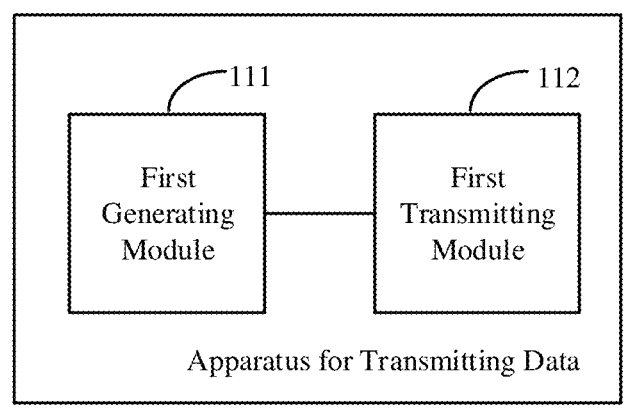
FIG. 11 is a block diagram illustrating another apparatus for transmitting data according to an exemplary embodiment.

In an embodiment, on the basis of the apparatus shown in FIG. 10, as shown in FIG. 11, the apparatus further includes: a first generating module 111 configured to generate first information, the first information indicating the first-selected unlicensed channel resource determined by the terminal; and a first transmitting module 112 configured to transmit the first information to the base station through a first designated signaling, to inform the base station of the first-selected unlicensed channel resource determined by the terminal.

Figure 12:
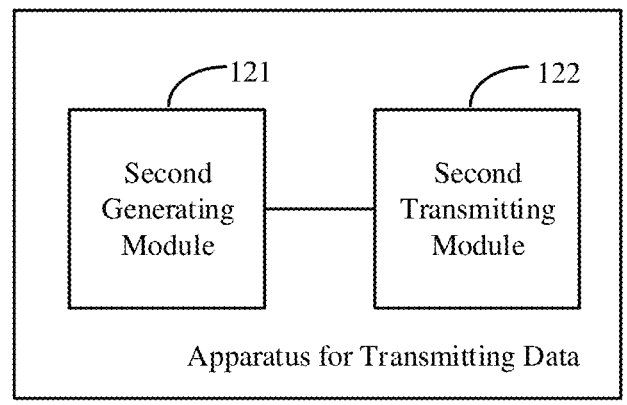
FIG. 12 is a block diagram illustrating another apparatus for transmitting data according to an exemplary embodiment.

In an embodiment, based on the apparatus shown in FIG. 10, as shown in FIG. 12, the apparatus further includes: a second generating module 121 configured to generate second information in response to that it is detected that the first-selected unlicensed channel resource is idle, the second information indicating that the first-selected unlicensed channel resource is taken as the first working channel resource by the terminal; and a second transmitting module 122 configured to transmit the second information to the base station through a second designated signaling, to inform the base station of the first-selected unlicensed channel resource being taken as the first working channel resource by the terminal.

Figure 13:
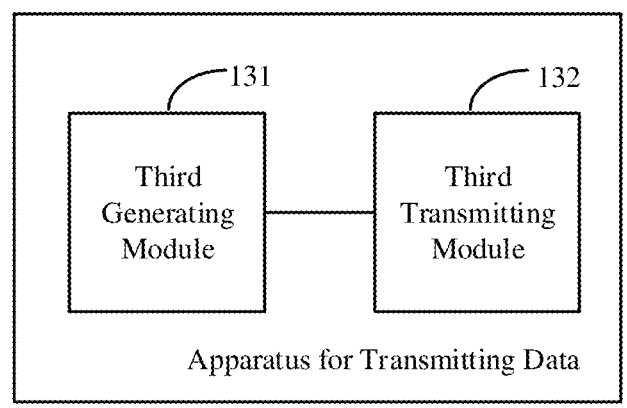
FIG. 13 is a block diagram illustrating another apparatus for transmitting data according to an exemplary embodiment.

In an embodiment, on the basis of the apparatus shown in FIG. 10, as shown in FIG. 13, the apparatus further includes: a third generating module 131 configured to generate third information in response to that it is detected that the current working channel resource is not idle, the third information indicating that the t the current working channel resource is not taken as the first working channel resource by the terminal; and a third transmitting module 132 configured to transmit the third information to the base station through a third designated signaling, to inform the base station the current working channel resource not being taken as the first working channel resource by the terminal and to trigger a switch of working channel resource.

In an embodiment, on the basis of the apparatus shown in FIG. 13, the third designated signaling is transmitted over a designated licensed channel resource.

Figure 14:
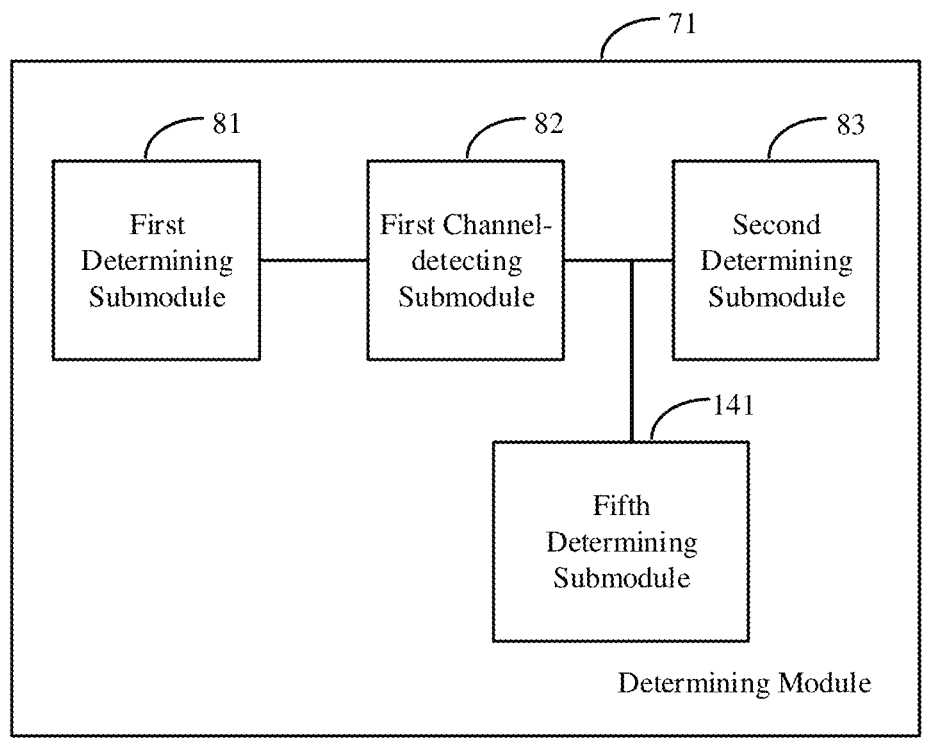
FIG. 14 is a block diagram illustrating another apparatus for transmitting data according to an exemplary embodiment.

In an embodiment, on the basis of the apparatus shown in FIG. 8, as shown in FIG. 14, the determining module 71 may further include: a fifth determining submodule 141 configured to determine, in response to that it is detected that the first-selected unlicensed channel resource is not idle, the first unlicensed channel resource in accordance with a preset rule from respective unlicensed channel resources on which no channel-detecting is performed.

In an embodiment, on the basis of the apparatus shown in FIG. 14, when the data transmitting end is a base station, the preset rule is set by the base station; when the data transmitting end is a terminal, the preset rule is set by the terminal, or set by the base station for the terminal and transmitted to the terminal through a fourth designated signaling.

Figure 15:
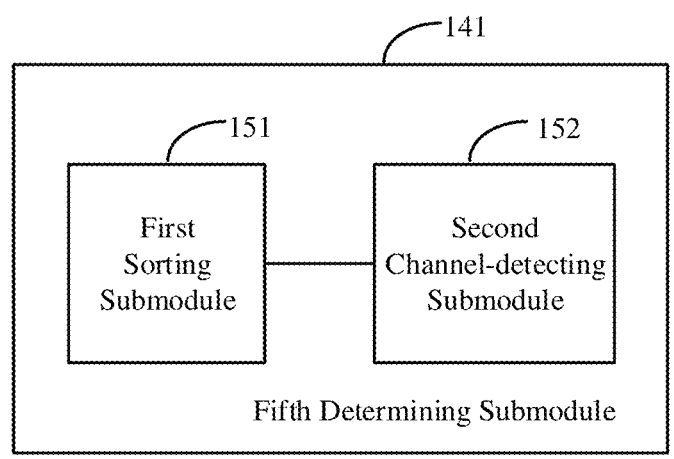
FIG. 15 is a block diagram illustrating another apparatus for transmitting data according to an exemplary embodiment.

In an embodiment, on the basis of the apparatus shown in FIG. 14, as shown in FIG. 15, the fifth determining submodule 141 may include: a first sorting submodule 151 configured to sort the respective unlicensed channel resources on which no channel-detecting is performed in accordance with a preset priority rule; and a second channel-detecting submodule 152 configured to perform, in a descending order of priority, channel-detecting on the respective unlicensed channel resources on which no channel-detecting is performed until one idle unlicensed channel resource is detected, and take the idle unlicensed channel resource as the first unlicensed channel resource.

Figure 16:
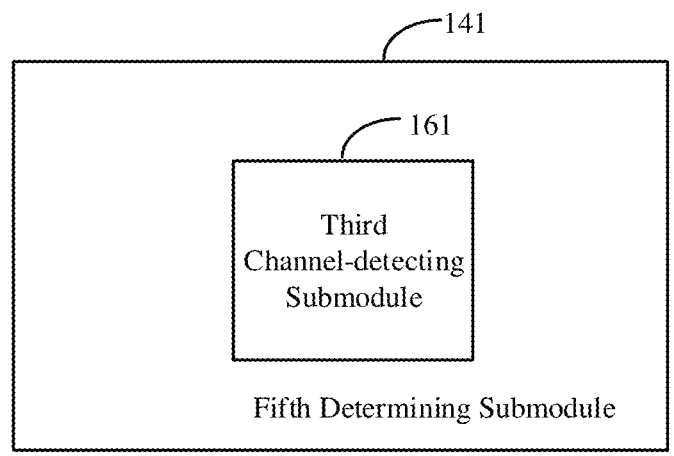
FIG. 16 is a block diagram illustrating another apparatus for transmitting data according to an exemplary embodiment.

In an embodiment, on the basis of the apparatus shown in FIG. 14, as shown in FIG. 16, the fifth determining submodule 141 may include: a third channel-detecting submodule 161 configured to perform, in a random order, channel-detecting on the respective unlicensed channel resources on which no channel-detecting is performed until one idle unlicensed channel resource is detected, and take the idle unlicensed channel resource as the first unlicensed channel resource.

Figure 17:
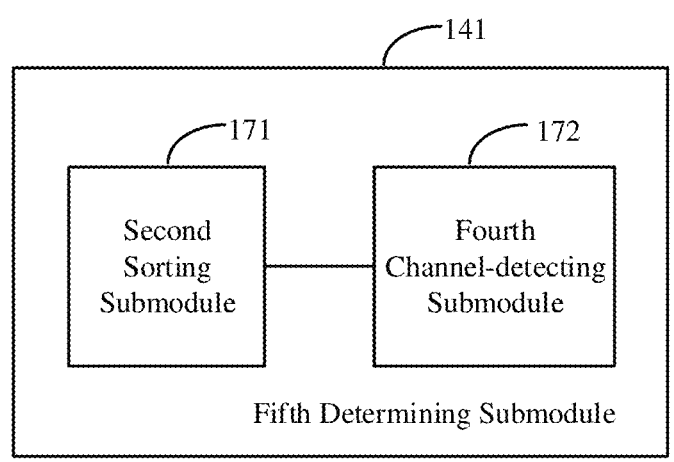
FIG. 17 is a block diagram illustrating another apparatus for transmitting data according to an exemplary embodiment.

In an embodiment, on the basis of the apparatus shown in FIG. 14, as shown in FIG. 17, the fifth determining submodule 141 may include: a second sorting submodule 171 configured to sort the respective unlicensed channel resources on which no channel-detecting is performed in accordance with a preset channel utilization rate criterion; and a fourth channel-detecting submodule 172 configured to perform, in an ascending order of channel utilization rate, channel-detecting on the respective unlicensed channel resources on which no channel-detecting is performed until one idle unlicensed channel resource is detected, and determine the idle unlicensed channel resource as the first unlicensed channel resource.

In the above embodiment, by determining a first-selected unlicensed channel resource from a plurality of unlicensed channel resources, performing channel-detecting on the first-selected unlicensed channel resource, determining the first-selected unlicensed channel resource as a first working channel resource for data transmission in response to detecting that the first-selected unlicensed channel resource is idle, and determining the first unlicensed channel resource for data transmission from the respective unlicensed channel resources on which no channel-detecting is performed in accordance with a preset rule in response to detecting that the first-selected unlicensed channel resource is not idle, it can be implemented that the first-selected unlicensed channel resource is preferentially taken as the first unlicensed channel resource for data transmission, thereby improving the reliability of data transmission.

Figure 18:
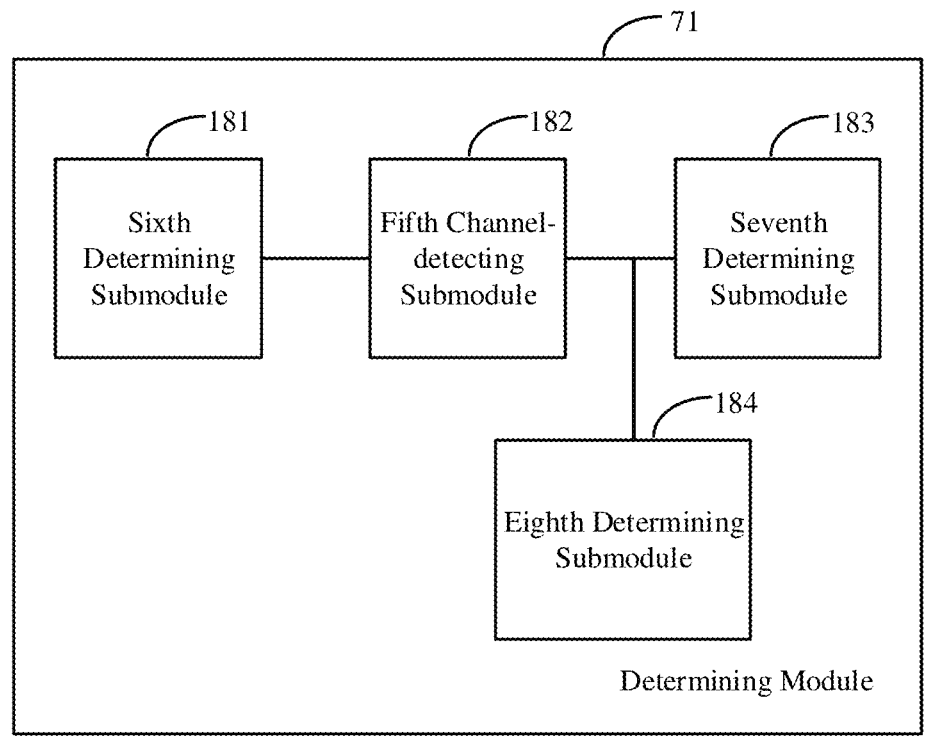
FIG. 18 is a block diagram illustrating another apparatus for transmitting data according to an exemplary embodiment.

In an embodiment, on the basis of the apparatus shown in FIG. 7, as shown in FIG. 18, the determining module 71 may include: a sixth determining submodule 181 configured to determine a first-selected unlicensed channel resource from the plurality of unlicensed channel resources; a fifth channel-detecting submodule 182 configured to perform channel-detecting on the first-selected unlicensed channel resource and remaining respective unlicensed channel resources among the plurality of unlicensed channel resources simultaneously; a seventh determining submodule 183 configured to determine the first-selected unlicensed channel resource as the first unlicensed channel resource in response to that the unlicensed channel resources detected as being idle include the first-selected unlicensed channel resource; and an eighth determining submodule 184 configured to select one idle unlicensed channel resource as the first unlicensed channel resource in response to that the unlicensed channel resources detected as being idle do not include the first-selected unlicensed channel resource.

In the above embodiment, by determining a first-selected unlicensed channel resource from a plurality of unlicensed channel resources, performing channel-detecting on the first-selected unlicensed channel resource and the remaining respective unlicensed channel resources among the plurality of unlicensed channel resources simultaneously, determining the first-selected unlicensed channel resource as a first unlicensed channel resource for data transmission in response to that the unlicensed channel resources detected as being idle include the first-selected unlicensed channel resource, and selecting one idle unlicensed channel resource as the first unlicensed channel resource for data transmission in response to that the unlicensed channel resources detected as being idle do not include the first-selected unlicensed channel resource, it can shorten the time for channel-detecting on the basis of ensuring that the first-selected unlicensed channel resource is preferentially taken as the first unlicensed channel resource for data transmission, thereby further reducing the time delay in data transmission.

Figure 19:
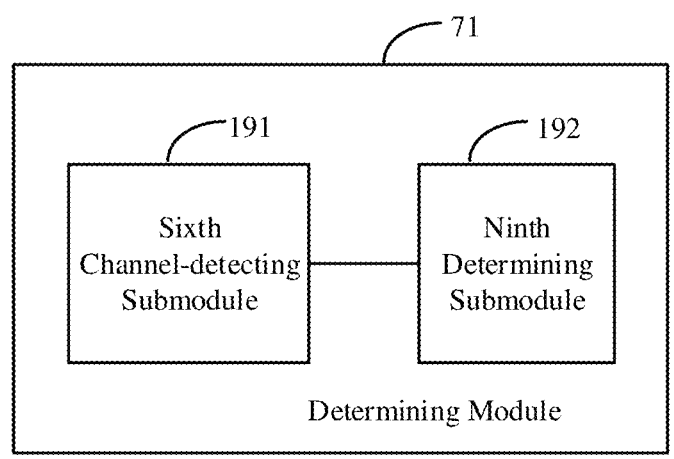
FIG. 19 is a block diagram illustrating another apparatus for transmitting data according to an exemplary embodiment.

In an embodiment, on the basis of the apparatus shown in FIG. 7, as shown in FIG. 19, the determining module 71 may include: a sixth channel-detecting submodule 191 configured to perform channel-detecting on the plurality of unlicensed channel resources simultaneously; and a ninth determining submodule 192 configured to determine, in response to that one unlicensed channel resource is detected as being idle, the idle unlicensed channel resource as the first unlicensed channel resource.

In the above embodiment, by performing channel-detecting on a plurality of unlicensed channel resources simultaneously, and in response to that one unlicensed channel resource is detected as being idle, determining the idle unlicensed channel resource as the first unlicensed channel resource for data transmission, it can shorten the time for channel-detecting and can also improve the efficiency of data transmission.

Figure 20:
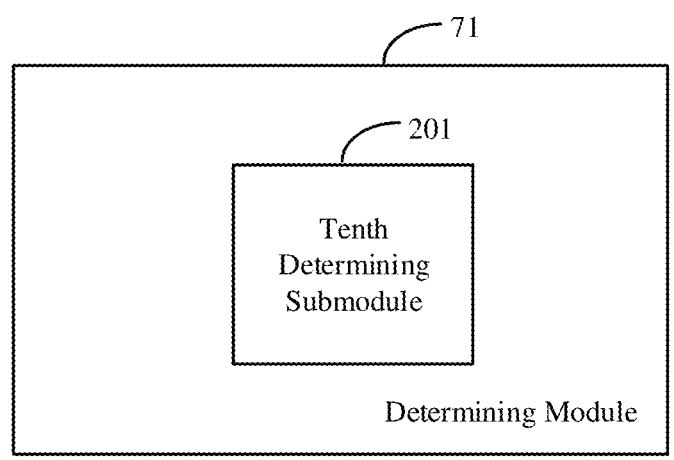
FIG. 20 is a block diagram illustrating another apparatus for transmitting data according to an exemplary embodiment.

In an embodiment, on the basis of the apparatus shown in FIG. 7, as shown in FIG. 20, the determining module 71 may include: a tenth determining submodule 201 configured to determine, in accordance with a designated rule, the first unlicensed channel resource which is idle from the plurality of unlicensed channel resources.

In an embodiment, on the basis of the apparatus shown in FIG. 20, when the data transmitting end is a base station, the designated rule is set by the base station; when the data transmitting end is a terminal, the designated rule is set by the terminal, or set by the base station for the terminal and transmitted to the terminal through a fifth designated signaling.

Figure 21:
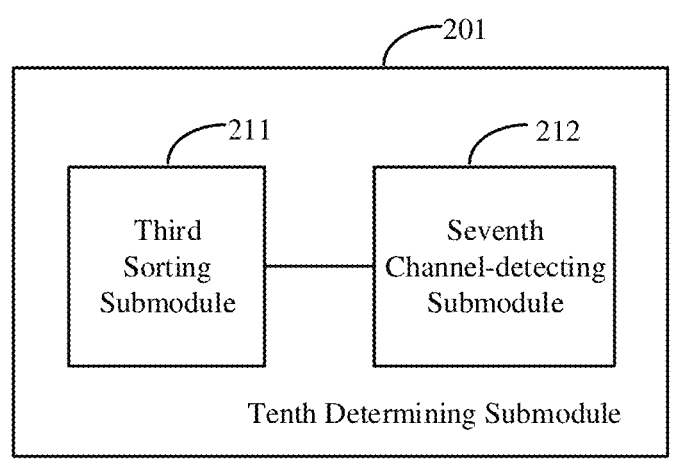
FIG. 21 is a block diagram illustrating another apparatus for transmitting data according to an exemplary embodiment.

In an embodiment, on the basis of the apparatus shown in FIG. 20, as shown in FIG. 21, the tenth determining submodule 201 may include: a third sorting submodule 211 configured to sort the plurality of unlicensed channel resources in accordance with a preset priority rule; and a seventh channel-detecting submodule 212 configured to perform, in a descending order of priority, channel-detecting on the plurality of unlicensed channel resources until one idle unlicensed channel resource is detected, and take the idle unlicensed channel resource as the first unlicensed channel resource.

Figure 22:
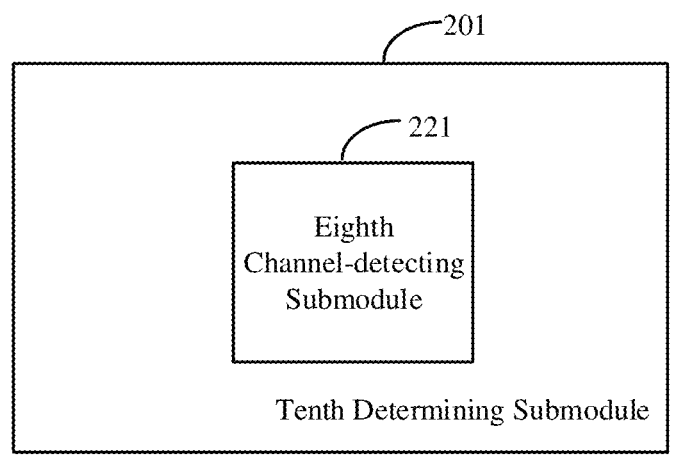
FIG. 22 is a block diagram illustrating another apparatus for transmitting data according to an exemplary embodiment.

In an embodiment, on the basis of the apparatus shown in FIG. 20, as shown in FIG. 22, the tenth determining submodule 201 may include: an eighth channel-detecting submodule 221 configured to perform, in a random order, channel-detecting on the plurality of unlicensed channel resources until one idle unlicensed channel resource is detected, and take the idle unlicensed channel resource as the first unlicensed channel resource.

Figure 23:
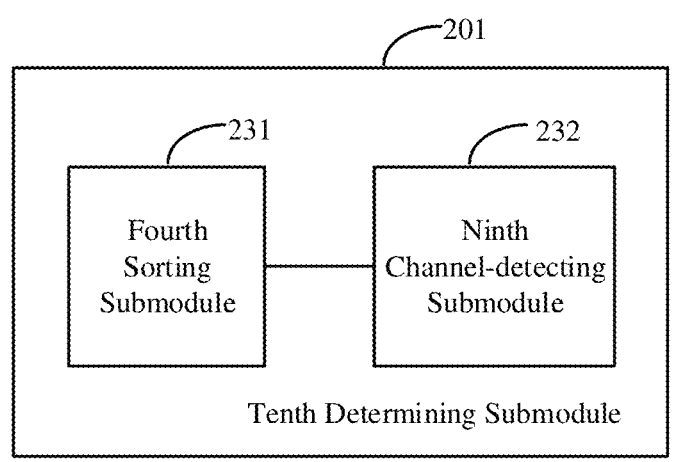
FIG. 23 is a block diagram illustrating another apparatus for transmitting data according to an exemplary embodiment.

In an embodiment, on the basis of the apparatus shown in FIG. 20, as shown in FIG. 23, the tenth determining submodule 201 may include: a fourth sorting submodule 231 configured to sort the plurality of unlicensed channel resources in accordance with a preset channel utilization rate criterion; and a ninth channel-detecting submodule 232 configured to perform, in an ascending order of channel utilization rate, channel-detecting on the plurality of unlicensed channel resources until one idle unlicensed channel resource is detected, and determine the idle unlicensed channel resource as the first unlicensed channel resource.

In the above embodiment, by determining a first unlicensed channel resource which is idle from a plurality of unlicensed channel resources in accordance with a designated rule, such as priority, random order, or channel utilization rate, the first unlicensed channel resource may be determined with enhanced reliability, and thereby improving the efficiency of data transmission.

Figure 24:
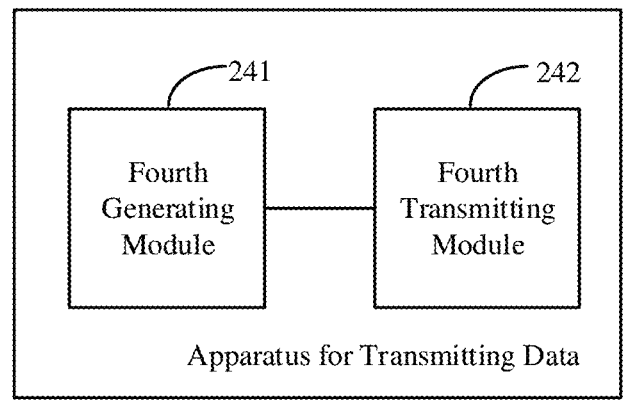
FIG. 24 is a block diagram illustrating another apparatus for transmitting data according to an exemplary embodiment.

In an embodiment, on the basis of the apparatus shown in FIG. 7, as shown in FIG. 24, the data transmitting end is a terminal; and the apparatus further includes: a fourth generating module 241 configured to generate fourth information, the fourth information indicating the first unlicensed channel resource determined by the terminal; and a fourth transmitting module 242 configured to transmit the fourth information to a base station through a sixth designated signaling, to inform the base station of the first unlicensed channel resource determined by the terminal.

In this way, in response to receiving the fourth information, the base station learns on which unlicensed channel resource the terminal is to transmit the data, thereby improving the reliability of data transmission.

Since the apparatus embodiments essentially correspond to the method embodiments, reference may be made to the description of related parts of the method embodiments. The apparatus embodiments described above are merely exemplary, where the modules described as separate components may or may not be physically separated, and the components displayed as modules may or may not be physical units, that is, may be located in one place or distributed to multiple networks. Some or all of the modules may be selected according to actual needs.

The present disclosure also provides a non-transitory computer-readable storage medium having stored thereon instructions that, when executed by a processor of a device, cause the device to perform the method of transmitting data described in any one of FIGS. 1 to 6.

The present disclosure also provides an apparatus for transmitting data. The apparatus is applicable to a data transmitting end, and the data transmitting end may have a plurality of unlicensed channel resources. The apparatus includes: a processor; and a memory for storing executable instructions by the processor. The processor is configured to: determine a first unlicensed channel resource which is idle from the plurality of unlicensed channel resources; set the first unlicensed channel resource as a first working channel resource for data transmission; and transmit data over the first working channel resource.

The data transmitting end may be a base station or a terminal. When the data transmitting end is the base station, the plurality of unlicensed channel resources are configured by the base station for the terminal. When the data transmitting end is the terminal, the plurality of unlicensed channel resources are configured by the base station for the terminal, and the terminal has set one or more of the plurality of unlicensed channel resources as the current working channel resources for data interaction.

Figure 25:
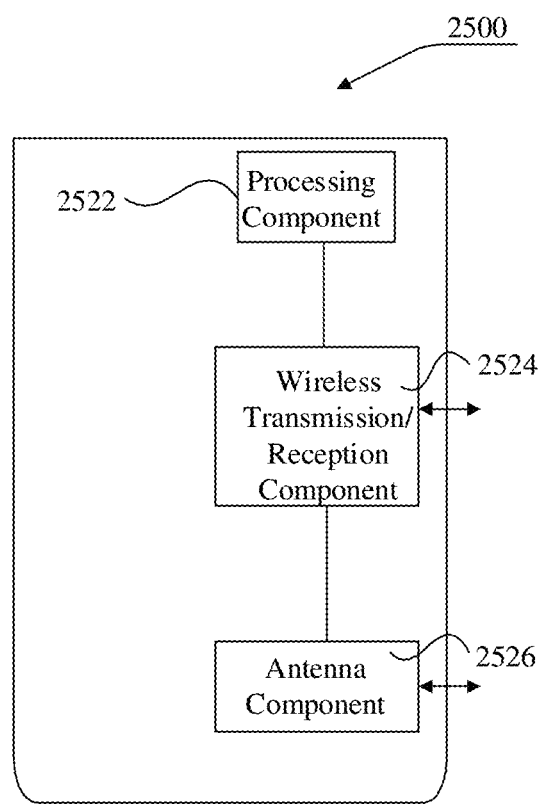
FIG. 25 is a schematic diagram illustrating a device for transmitting data according to an exemplary embodiment.

FIG. 25 is a schematic diagram illustrating a device 2500 for transmitting data according to an exemplary embodiment. The device 2500 may be provided as a base station. Referring to FIG. 25, the device 2500 includes a processing component 2522, a wireless transmission/reception component 2524, an antenna component 2526, and a signal processing part peculiar to the wireless interface. The processing component 2522 may further include one or more processors.

One of the processors of the processing component 2522 may be configured to perform any one of the above methods of transmitting data.

Figure 26:
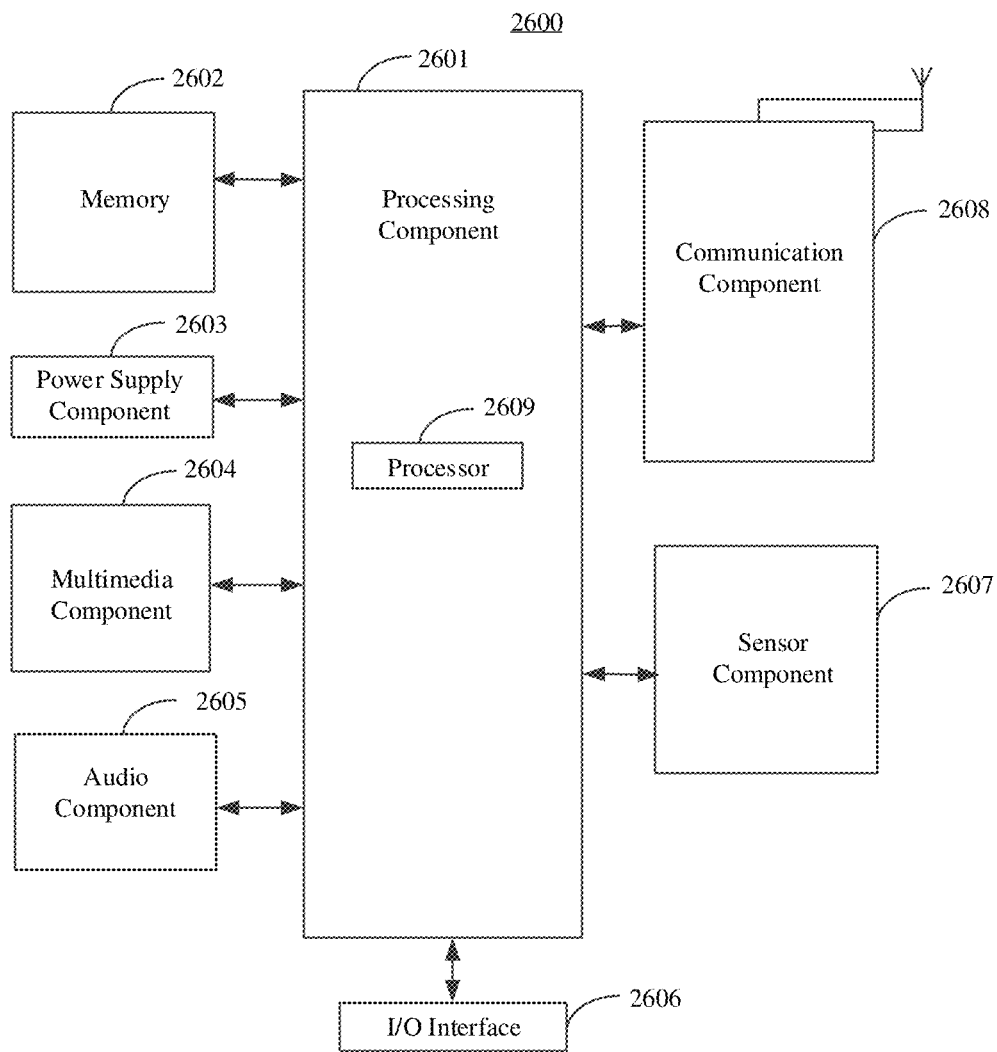
FIG. 26 is a schematic diagram illustrating a device for transmitting data according to an exemplary embodiment.

FIG. 26 is a block diagram illustrating a device 2600 for transmitting data according to an exemplary embodiment. As shown in FIG. 26, the device 2600 for transmitting data may be a terminal, such as a computer, a mobile phone, a digital broadcasting terminal, a messaging device, a game console, a tablet device, a medical device, fitness equipment, a personal digital assistant, or the like.

Referring to FIG. 26, the device 2600 may include one or more of the following components: a processing component 2601, a memory 2602, a power supply component 2603, a multimedia component 2604, an audio component 2605, an input/output (I/O) interface 2606, a sensor component 2607, and a communication component 2608.

The processing component 2601 generally controls the overall operations of the device 2600, such as operations associated with display, phone calls, data communications, camera operations, and recording operations. The processing component 2601 may include one or more processors 2609 to execute instructions to complete all or part of the steps of the above methods. In addition, the processing component 2601 may include one or more modules to facilitate interaction between the processing component 2601 and other components. For example, the processing component 2601 may include a multimedia module to facilitate interaction between the multimedia component 2604 and the processing component 2601.

The memory 2602 is configured to store various types of data to support operation at the device 2600. Examples of such data include instructions for any application or method operated on the device 2600, contact data, phonebook data, messages, pictures, videos, and on the like. The memory 2602 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2603 supplies power for different components of the device 2600. The power supply component 2603 may include a power supply management system, one or more power supplies, and other components associated with generating, managing, and distributing power for the device 2600.

The multimedia component 2604 includes a screen providing an output interface between the device 2600 and a user. In some embodiments, the screen may include a Liquid Crystal Display (LCD) and a Touch Panel (TP). If the screen includes the touch panel, the screen may be implemented as a touch screen to receive input signals from the user. The touch panel may include one or more touch sensors to sense touches, swipes, and gestures on the touch panel. The touch sensors may sense not only the boundary of the touch or swipe, but also the duration and pressure associated with the touch or swipe. In some embodiments, the multimedia component 2604 may include a front camera and/or a rear camera. The front camera and/or the rear camera may receive external multimedia data when the device 2600 is in an operating mode, such as a shooting mode or a video mode. Each of the front camera and the rear camera may be a fixed optical lens system or have focal length and optical zooming capabilities.

The audio component 2605 is configured to output and/or input audio signals. For example, the audio component 2605 includes a microphone (MIC) that is configured to receive an external audio signal when the device 2600 is in an operating mode, such as a call mode, a recording mode, and a voice recognition mode. The received audio signal may be further stored in the memory 2602 or sent via the communication component 2608. In some embodiments, the audio component 2605 further includes a speaker for outputting audio signals.

The I/O interface 2606 provides an interface between the processing component 2601 and a peripheral interface module. The above peripheral interface module may be a keyboard, a click wheel, buttons, or the like. These buttons may include, but not limited to, a home button, a volume button, a start button and a lock button.

The sensor component 2607 includes one or more sensors to provide the device 2600 with status assessments in various aspects. For example, the sensor component 2607 may detect the on/off status of the device 2600, and a relative positioning of components, for example, the components is a display and a keypad of the device 2600. The sensor component 2607 may also detect a change in position of the device 2600 or a component of the device 2600, a presence or absence of the contact between a user and the device 2600, an orientation or an acceleration/deceleration of the device 2600, and a change in temperature of the device 2600. The sensor component 2607 may include a proximity sensor configured to detect the presence of a nearby object without any physical contact. The sensor component 2607 may further include an optical sensor, such as a Complementary Metal-Oxide-Semiconductor (CMOS) or Charged Coupled Device (CCD) image sensor which is used in imaging applications. In some embodiments, the sensor component 2607 may further include an acceleration sensor, a gyroscope sensor, a magnetic sensor, a pressure sensor, or a temperature sensor.

The communication component 2608 is configured to facilitate wired or wireless communication between the device 2600 and other devices. The device 2600 may access a wireless network based on a communication standard, such as Wi-Fi, 4G or 5G, or a combination thereof. In an exemplary embodiment, the communication component 2608 receives broadcast signals or broadcast related information from an external broadcast management system via a broadcast channel. In an exemplary embodiment, the communication component 2608 may further include a Near Field Communication (NFC) module for promoting short-range communication. In an exemplary embodiment, the communication component 2608 may be implemented based on a radio frequency identification (RFID) technology, an infrared data association (IrDA) technology, an ultra-wideband (UWB) technology, a Blue Tooth (BT) technology and other technologies.

In an exemplary embodiment, the device 2600 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an exemplary embodiment, there is further provided a non-transitory computer-readable storage medium including instructions, such as the memory 2602 including instructions. The instructions may be executed by the processor 2609 of the device 2600 to perform the above described methods. For example, the non-transitory computer-readable storage medium may be a Read-Only Memory (ROM), a Random Access Memory (RAM), a CD-ROM, a magnetic tape, a floppy disk, an optical data storage device, and the like.

Other implementations of the present disclosure will be readily apparent to those skilled in the art after considering the specification. The present application is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are indicated by appended claims.

It should be understood that the present disclosure is not limited to the above described accurate structures shown in the drawings, and various modifications and changes can be made to the present disclosure without departing from the scope thereof. The scope of the present disclosure is to be limited only by the appended claims.

The invention claimed is:

1. A method of transmitting data, performed by a device with a plurality of unlicensed channel resources, the method comprising:
determining a first unlicensed channel resource which is idle from the plurality of unlicensed channel resources;
setting the first unlicensed channel resource as a first working channel resource for data transmission; and
transmitting data over the first working channel resource,
wherein the determining the first unlicensed channel resource which is idle from the plurality of unlicensed channel resources comprises:
determining a first-selected unlicensed channel resource from the plurality of unlicensed channel resources;
performing channel-detecting on the first-selected unlicensed channel resource; and
determining the first-selected unlicensed channel resource as the first unlicensed channel resource in response to detecting that the first-selected unlicensed channel resource is idle,
wherein the method further comprises:
determining, in response to detecting that the first-selected unlicensed channel resource is not idle, the first unlicensed channel resource in accordance with a preset rule from respective unlicensed channel resources on which no channel-detecting is performed, wherein when the preset rule is a preset priority rule, the determining the first unlicensed channel resource in accordance with the preset rule from the respective unlicensed channel resources on which no channel-detecting is performed comprises:
sorting the respective unlicensed channel resources on which no channel-detecting is performed in accordance with the preset priority rule;
performing, in a descending order of priority, channel-detecting on the respective unlicensed channel resources on which no channel-detecting is performed until one idle unlicensed channel resource is detected, and
taking the idle unlicensed channel resource as the first unlicensed channel resource;

when the preset rule is a random order rule, the determining the first unlicensed channel resource in accordance with the preset rule from the respective unlicensed channel resources on which no channel-detecting is performed comprises:
performing, in a random order, channel-detecting on the respective unlicensed channel resources on which no channel-detecting is performed until one idle unlicensed channel resource is detected, and
taking the idle unlicensed channel resource as the first unlicensed channel resource; and when the preset rule is a preset channel utilization rate criterion, the determining the first unlicensed channel resource in accordance with the preset rule from the respective unlicensed channel resources on which no channel-detecting is performed comprises:
sorting the respective unlicensed channel resources on which no channel-detecting is performed in accordance with the preset channel utilization rate criterion;
performing, in an ascending order of channel utilization rate, channel-detecting on the respective unlicensed channel resources on which no channel-detecting is performed until one idle unlicensed channel resource is detected, and
determining the idle unlicensed channel resource as the first unlicensed channel resource; or wherein the determining the first unlicensed channel resource which is idle from the plurality of unlicensed channel resources comprises:
determining, in accordance with a designated rule, the first unlicensed channel resource which is idle from the plurality of unlicensed channel resources,
wherein when the designated rule is a preset priority rule, the determining, in accordance with the designated rule, the first unlicensed channel resource which is idle from the plurality of unlicensed channel resources comprises:
sorting the plurality of unlicensed channel resources in accordance with the preset priority rule;
performing, in a descending order of priority, channel-detecting on the plurality of unlicensed channel resources until one idle unlicensed channel resource is detected; and
taking the idle unlicensed channel resource as the first unlicensed channel resource;
when the designated rule is a random order rule, the determining, in accordance with the designated rule, the first unlicensed channel resource which is idle from the plurality of unlicensed channel resources comprises:
performing, in a random order, channel-detecting on the plurality of unlicensed channel resources until one idle unlicensed channel resource is detected; and
taking the idle unlicensed channel resource as the first unlicensed channel resource; and
when the designated rule is a preset channel utilization rate criterion, the determining, in accordance with the designated rule, the first unlicensed channel resource which is idle from the plurality of unlicensed channel resources comprises:
sorting the plurality of unlicensed channel resources in accordance with the preset channel utilization rate criterion;
performing, in an ascending order of channel utilization rate, channel-detecting on the plurality of unlicensed channel resources until one idle unlicensed channel resource is detected; and
determining the idle unlicensed channel resource as the first unlicensed channel resource.

2. The method according to claim 1, wherein the plurality of unlicensed channel resources comprise one of:
a plurality of bandwidth parts configured on an unlicensed carrier,
a plurality of unlicensed carriers, or
a plurality of bandwidth parts configured on a plurality of unlicensed carriers.

3. The method according to claim 1, wherein the device is a base station and the plurality of unlicensed channel resources are configured by the base station for a terminal;
the determining the first-selected unlicensed channel resource from the plurality of unlicensed channel resources comprises:
determining the first-selected unlicensed channel resource based on one of historical state information corresponding to the plurality of unlicensed channel resources stored by the base station, or channel state information corresponding to the plurality of unlicensed channel resources reported by the terminal.

4. The method according to claim 1, wherein the device is a terminal, the plurality of unlicensed channel resources are configured by a base station for the terminal, and the terminal has set one or more of the plurality of unlicensed channel resources as a current working channel resource for data interaction;
the determining the first-selected unlicensed channel resource from the plurality of unlicensed channel resources comprises:
determining the first-selected unlicensed channel resource from the plurality of unlicensed channel resources in accordance with a predefined rule.

5. The method according to claim 4, wherein the determining the first-selected unlicensed channel resource from the plurality of unlicensed channel resources in accordance with the predefined rule comprises:
determining the current working channel resource as the first-selected unlicensed channel resource.

6. The method according to claim 5, further comprising:
generating, in response to detecting that the current working channel resource is not idle, third information to indicate that the current working channel resource is not taken as the first working channel resource by the terminal; and transmitting the third information to the base station through a third designated signaling, to inform the base station of the current working channel resource not being taken as the first working channel resource by the terminal and to trigger a switch of working channel resource.

7. The method according to claim 6, wherein the third designated signaling is transmitted over a designated licensed channel resource.

8. The method according to claim 4, further comprising:
generating first information to indicate the first-selected unlicensed channel resource determined by the terminal; and
transmitting the first information to the base station through a first designated signaling, to inform the base station of the first-selected unlicensed channel resource determined by the terminal.

9. The method according to claim 4, further comprising:
generating, in response to detecting that the first-selected unlicensed channel resource is idle, second information to indicate that the first-selected unlicensed channel resource is taken as the first working channel resource by the terminal; and
transmitting the second information to the base station through a second designated signaling, to inform the base station of the first-selected unlicensed channel resource being taken as the first working channel resource by the terminal.

10. The method according to claim 1, wherein
when the device is a base station, the preset rule is set by the base station; and
when the device is a terminal, the preset rule is set by the terminal, or set by the base station for the terminal and transmitted to the terminal through a fourth designated signaling.

11. The method according to claim 1, wherein the determining the first unlicensed channel resource which is idle from the plurality of unlicensed channel resources comprises:
determining a first-selected unlicensed channel resource from the plurality of unlicensed channel resources;
performing channel-detecting on the first-selected unlicensed channel resource and remaining unlicensed channel resources among the plurality of unlicensed channel resources simultaneously;
determining the first-selected unlicensed channel resource as the first unlicensed channel resource in response to that unlicensed channel resources detected as being idle comprise the first-selected unlicensed channel resource; and
selecting one idle unlicensed channel resource as the first unlicensed channel resource in response to that unlicensed channel resources detected as being idle do not comprise the first-selected unlicensed channel resource.

12. The method according to claim 1, wherein the determining the first unlicensed channel resource which is idle from the plurality of unlicensed channel resources comprises:
performing channel-detecting on the plurality of unlicensed channel resources simultaneously; and
determining, in response to that one unlicensed channel resource is detected as being idle, the idle unlicensed channel resource as the first unlicensed channel resource.

13. The method according to claim 1, wherein:
when the device is a base station, the designated rule is set by the base station; and
when the device is a terminal, the designated rule is set by the terminal, or set by the base station for the terminal and transmitted to the terminal through a fifth designated signaling.

14. The method according to claim 1, wherein the device is a terminal; and the method further comprises:
generating fourth information to indicate the first unlicensed channel resource determined by the terminal; and
transmitting the fourth information to a base station through a sixth designated signaling, to inform the base station of the first unlicensed channel resource determined by the terminal.

15. A device, comprising:
a processor; and
a memory for storing instructions executable by the processor;
wherein the processor is configured to:
determine a first unlicensed channel resource which is idle from a plurality of unlicensed channel resources;
set the first unlicensed channel resource as a first working channel resource for data transmission; and
transmit data over the first working channel resource;
wherein in determining the first unlicensed channel resource which is idle from a plurality of unlicensed channel resources, the processor is further configured to:
determine a first-selected unlicensed channel resource from the plurality of unlicensed channel resources;
perform channel-detecting on the first-selected unlicensed channel resource; and
determine the first-selected unlicensed channel resource as the first unlicensed channel resource in response to detecting that the first-selected unlicensed channel resource is idle, and
the processor is further configured to:
determine, in response to detecting that the first-selected unlicensed channel resource is not idle, the first unlicensed channel resource in accordance with a preset rule from respective unlicensed channel resources on which no channel-detecting is performed,
wherein when the preset rule is a preset priority rule, in determining the first unlicensed channel resource in accordance with the preset rule from the respective unlicensed channel resources on which no channel-detecting is performed, the processor is further configured to:
sort the respective unlicensed channel resources on which no channel-detecting is performed in accordance with the preset priority rule;
perform, in a descending order of priority, channel-detecting on the respective unlicensed channel resources on which no channel-detecting is performed until one idle unlicensed channel resource is detected, and
take the idle unlicensed channel resource as the first unlicensed channel resource;
when the preset rule is a random order rule, in determining the first unlicensed channel resource in accordance with the preset rule from the respective unlicensed channel resources on which no channel-detecting is performed, the processor is further configured to:

perform, in a random order, channel-detecting on the respective unlicensed channel resources on which no channel-detecting is performed until one idle unlicensed channel resource is detected, and take the idle unlicensed channel resource as the first unlicensed channel resource; and when the preset rule is a preset channel utilization rate criterion, in determining the first unlicensed channel resource in accordance with the preset rule from the respective unlicensed channel resources on which no channel-detecting is performed, the processor is further configured to:

sort the respective unlicensed channel resources on which no channel-detecting is performed in accordance with the preset channel utilization rate criterion;

perform, in an ascending order of channel utilization rate, channel-detecting on the respective unlicensed channel resources on which no channel-detecting is performed until one idle unlicensed channel resource is detected, and determine the idle unlicensed channel resource as the first unlicensed channel resource; or wherein in determining the first unlicensed channel resource which is idle from the plurality of unlicensed channel resources, the processor is further configured to:

determine, in accordance with a designated rule, the first unlicensed channel resource which is idle from the plurality of unlicensed channel resources, wherein when the designated rule is a preset priority rule, in determining, in accordance with the designated rule, the first unlicensed channel resource which is idle from the plurality of unlicensed channel resources, the processor is further configured to:

sort the plurality of unlicensed channel resources in accordance with the preset priority rule;

perform, in a descending order of priority, channel-detecting on the plurality of unlicensed channel resources until one idle unlicensed channel resource is detected; and take the idle unlicensed channel resource as the first unlicensed channel resource;

when the designated rule is a random order rule, in determining, in accordance with the designated rule, the first unlicensed channel resource which is idle from the plurality of unlicensed channel resources, the processor is further configured to:

perform, in a random order, channel-detecting on the plurality of unlicensed channel resources until one idle unlicensed channel resource is detected; and take the idle unlicensed channel resource as the first unlicensed channel resource; and when the designated rule is a preset channel utilization rate criterion, in determining, in accordance with the designated rule, the first unlicensed channel resource which is idle from the plurality of unlicensed channel resources, the processor is further configured to:

sort the plurality of unlicensed channel resources in accordance with the preset channel utilization rate criterion;

perform, in an ascending order of channel utilization rate, channel-detecting on the plurality of unlicensed channel resources until one idle unlicensed channel resource is detected; and determine the idle unlicensed channel resource as the first unlicensed channel resource.

16. A non-transitory computer-readable storage medium having stored therein instructions that, when executed by one or more processors of a device, cause the device to perform:

determining a first unlicensed channel resource which is idle from a plurality of unlicensed channel resources;

setting the first unlicensed channel resource as a first working channel resource for data transmission; and transmitting data over the first working channel resource;

wherein the determining the first unlicensed channel resource which is idle from the plurality of unlicensed channel resources comprises:

determining a first-selected unlicensed channel resource from the plurality of unlicensed channel resources;

performing channel-detecting on the first-selected unlicensed channel resource; and determining the first-selected unlicensed channel resource as the first unlicensed channel resource in response to detecting that the first-selected unlicensed channel resource is idle, wherein the device is caused further to perform:

determining, in response to detecting that the first-selected unlicensed channel resource is not idle, the first unlicensed channel resource in accordance with a preset rule from respective unlicensed channel resources on which no channel-detecting is performed, wherein when the preset rule is a preset priority rule, the determining the first unlicensed channel resource in accordance with the preset rule from the respective unlicensed channel resources on which no channel-detecting is performed comprises:

sorting the respective unlicensed channel resources on which no channel-detecting is performed in accordance with the preset priority rule;

performing, in a descending order of priority, channel-detecting on the respective unlicensed channel resources on which no channel-detecting is performed until one idle unlicensed channel resource is detected, and taking the idle unlicensed channel resource as the first unlicensed channel resource;

when the preset rule is a random order rule, the determining the first unlicensed channel resource in accordance with the preset rule from the respective unlicensed channel resources on which no channel-detecting is performed comprises:

performing, in a random order, channel-detecting on the respective unlicensed channel resources on which no channel-detecting is performed until one idle unlicensed channel resource is detected, and taking the idle unlicensed channel resource as the first unlicensed channel resource; and when the preset rule is a preset channel utilization rate criterion, the determining the first unlicensed channel resource in accordance with the preset rule from the respective unlicensed channel resources on which no channel-detecting is performed comprises:

sorting the respective unlicensed channel resources on which no channel-detecting is performed in accordance with the preset channel utilization rate criterion:

performing, in an ascending order of channel utilization rate, channel-detecting on the respective unlicensed channel resources on which no channel-detecting is performed until one idle unlicensed channel resource is detected, and determining the idle unlicensed channel resource as the first unlicensed channel resource; or wherein the determining the first unlicensed channel resource which is idle from the plurality of unlicensed channel resources comprises:

determining, in accordance with a designated rule, the first unlicensed channel resource which is idle from the plurality of unlicensed channel resources, wherein when the designated rule is a preset priority rule, the determining, in accordance with the designated rule, the first unlicensed channel resource which is idle from the plurality of unlicensed channel resources comprises:

sorting the plurality of unlicensed channel resources in accordance with the preset priority rule;

performing, in a descending order of priority, channel-detecting on the plurality of unlicensed channel resources until one idle unlicensed channel resource is detected; and taking the idle unlicensed channel resource as the first unlicensed channel resource;

when the designated rule is a random order rule, the determining, in accordance with the designated rule, the first unlicensed channel resource which is idle from the plurality of unlicensed channel resources comprises:

performing, in a random order, channel-detecting on the plurality of unlicensed channel resources until one idle unlicensed channel resource is detected; and taking the idle unlicensed channel resource as the first unlicensed channel resource; and when the designated rule is a preset channel utilization rate criterion, the determining, in accordance with the designated rule, the first unlicensed channel resource which is idle from the plurality of unlicensed channel resources comprises:

sorting the plurality of unlicensed channel resources in accordance with the preset channel utilization rate criterion;

performing, in an ascending order of channel utilization rate, channel-detecting on the plurality of unlicensed channel resources until one idle unlicensed channel resource is detected; and determining the idle unlicensed channel resource as the first unlicensed channel resource.

* * * * *